United States Patent
Su et al.

(10) Patent No.: US 10,778,307 B2
(45) Date of Patent: Sep. 15, 2020

(54) BEAM SCANNING AND SEARCH TRACKING METHOD AND DEVICE

(71) Applicant: CHINA ACADEMY OF TELECOMMUNICATIONS TECHNOLOGY, Beijing (CN)

(72) Inventors: Xin Su, Beijing (CN); Qiubin Gao, Beijing (CN); Rakesh Tamrakar, Beijing (CN); Runhua Chen, Beijing (CN); Chuanjun Li, Beijing (CN); Mengjun Wang, Beijing (CN); Hui Li, Beijing (CN); Qiuping Huang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/337,373

(22) PCT Filed: Sep. 13, 2017

(86) PCT No.: PCT/CN2017/101513
§ 371 (c)(1),
(2) Date: Mar. 27, 2019

(87) PCT Pub. No.: WO2018/059235
PCT Pub. Date: Apr. 5, 2018

(65) Prior Publication Data
US 2020/0036421 A1  Jan. 30, 2020

(30) Foreign Application Priority Data
Sep. 30, 2016  (CN) .......................... 2016 1 0875295

(51) Int. Cl.
*H04L 7/06* (2006.01)
*H04B 7/06* (2006.01)
(Continued)

(52) U.S. Cl.
CPC ......... *H04B 7/0617* (2013.01); *H04B 7/0452* (2013.01); *H04B 7/0626* (2013.01);
(Continued)

(58) Field of Classification Search
CPC .. H04B 7/0456; H04B 7/0617; H04B 7/0452; H04B 7/0417; H04B 17/24; H04B 7/0652; H04B 7/0695; H04B 7/088
(Continued)

(56) References Cited

U.S. PATENT DOCUMENTS

| | | | |
|---|---|---|---|
| 2011/0291891 A1* | 12/2011 | Nsenga | H04B 7/0617 342/373 |
| 2013/0039445 A1* | 2/2013 | Hwang | H04B 7/0617 375/316 |

(Continued)

FOREIGN PATENT DOCUMENTS

| | | |
|---|---|---|
| CN | 103916171 A | 7/2014 |
| CN | 104052535 A | 9/2014 |

(Continued)

OTHER PUBLICATIONS

Nokia et al., Digital Subsystem with Hybrid Beamforming, R1-167291, 3GPP TSG-RAN WG1#86, Aug. 22, 2016 (Aug. 22, 2016), entire document.
(Continued)

*Primary Examiner* — Emmanuel Bayard
(74) *Attorney, Agent, or Firm* — Ladas & Parry, LLP

(57) ABSTRACT

A beam scanning and search tracking method and device are provided. The method includes constructing analog beams and performing digital beam-forming to the analog beams so as to form equivalent beams; transmitting reference signals to a second communication node by using the equivalent beams; receiving beam information about the equivalent beams and corresponding channel state information fed back
(Continued)

by the second communication node according to the reference signals; performing a beam scanning operation and a search tracking operation by using the beam information and the channel state information.

20 Claims, 3 Drawing Sheets

(51) Int. Cl.
*H04B 7/0452* (2017.01)
*H04B 7/08* (2006.01)
*H04L 5/00* (2006.01)
*H04W 16/28* (2009.01)
(52) U.S. Cl.
CPC .......... *H04B 7/0695* (2013.01); *H04B 7/088* (2013.01); *H04L 5/0048* (2013.01); *H04W 16/28* (2013.01)
(58) Field of Classification Search
USPC ................................. 375/267, 299, 347–349
See application file for complete search history.

(56) References Cited

U.S. PATENT DOCUMENTS

| 2013/0258972 | A1  | 10/2013 | Kim et al. |
| 2013/0315328 | A1* | 11/2013 | Liu ...................... H04B 7/0413 375/267 |
| 2014/0146863 | A1  | 5/2014  | Seol et al. |
| 2014/0278385 | A1* | 9/2014  | Fan ........................ G02C 11/10 704/226 |
| 2015/0131751 | A1* | 5/2015  | Bayesteh ............. H04B 7/0413 375/267 |
| 2015/0236774 | A1* | 8/2015  | Son ...................... H04B 7/0639 375/267 |
| 2015/0244432 | A1  | 8/2015  | Wang |
| 2017/0207845 | A1* | 7/2017  | Moon .................. H04B 7/0695 |
| 2017/0245259 | A1* | 8/2017  | Islam .................... H04L 5/0048 |
| 2018/0006696 | A1* | 1/2018  | Yue ...................... H04W 72/046 |
| 2018/0062722 | A1  | 3/2018  | Su et al. |
| 2018/0279293 | A1* | 9/2018  | Harrison ............. H04B 7/0639 |
| 2019/0182007 | A1* | 6/2019  | Liu ......................... H04L 5/005 |

FOREIGN PATENT DOCUMENTS

| CN | 104919715 A   | 9/2015 |
| CN | 105340132 A   | 2/2016 |
| CN | 105684321 A   | 6/2016 |
| CN | 106899334 A   | 6/2017 |
| WO | 2016028111 A1 | 2/2016 |
| WO | 2016141782 A1 | 9/2016 |

OTHER PUBLICATIONS

International Search Report for PCT/CN2017/101513 dated Nov. 28, 2017 and its English translation provided by WIPO.
Written Opinion for PCT/CN2017/101513 dated Nov. 28, 2017 and its English translation provided by Google Translate.
First Office Action and Search Report for CN app. No. 201610875295.6, dated Apr. 19, 2019, with machine English translation.
"Principles for Reference Signal Design and QCL Assumptions for NR", R1-167224, 3GPP TSG RAN WG1 Meeting #86, Gothenburg, Sweden, Aug. 22-26, 2016.
Extended European Search Report from EP app. No. 17854685.9, dated Jul. 23, 2019.
Written Opinion of the International Searching Authority from PCT/CN2017/101513, dated Nov. 28, 2017, with English translation from WIPO.
International Preliminary Report of Patentability from PCT/CN2017/101513, dated Apr. 2, 2019, with machine English translation from WIPO.

* cited by examiner

BEAM SCANNING AND SEARCH TRACKING METHOD AND DEVICE

CROSS-REFERENCE TO RELATED APPLICATIONS

This application is the U.S. National Stage of International Patent Application No. PCT/CN2017/101513 filed on Sep. 13, 2017, which claims a priority to Chinese Patent application No. 201610875295.6 filed in the China National Intellectual Property Administration on Sep. 30, 2016, the disclosures of which are incorporated herein by reference in their entireties.

TECHNICAL FIELD

The present disclosure relates to a field of communication technology, and, in particular, to a beam scanning and search tracking method and a beam scanning and search tracking device.

BACKGROUND

Since a technology called "Multiple-Input Multiple-Output (MIMO) plays an important role to increase a peak rate and a spectral efficiency for a system, standards for radio access techniques such as Long Term Evolution (LTE)/LTE-Advanced (LTE-A, i.e., a subsequent long term evolution) are established based on MIMO+OFDM (Orthogonal Frequency Division Multiplexing). A performance gain of the MIMO technique is from a spatial freedom degree obtainable from a multi-antenna system. Thus, a most important evolution direction in a standardization process of the MIMO technique is a dimension extension. In Release version 8 of the LTE, a four-layer MIMO transmission may be supported at most. In Release 9, a Multi-User MIMO (MU-MIMO) technique is enhanced specifically, and in a MU-MIMO transmission in a Transmission Mode (TM)-8, four downlink data layers may be supported at most. In Release 10, a spatial resolution of Channel State Information (the Channel State Information (CSI) may include a Channel Quality Indicator (CQI), a Precoding Matrix Indicator (PMI), a Rank Indication (RI)) is further increased by introducing an eight-port Channel State Information Reference Signal (CSI-RS), a User Equipment (UE)-specific Reference Signal (URS) and a multi-granularity codebook, and a transmission capability of a Single-User MIMO (SU-MIMO) is expanded to eight data layers at most.

In an antenna system of a base station utilizing a traditional Passive Antenna System (PAS), multiple antenna ports (each of the antenna ports corresponds to an independent Radio Frequency (RF)-Intermediate Frequency (IF)-Baseband channel) are arranged horizontally, and multiple oscillators in a vertical dimension corresponding to each of the ports are connected by a RF cable. Therefore, a relevant MIMO technique may only optimize a spatial characteristic of signals of each terminal in a horizontal dimension by adjusting a relative amplitude/a relative phase among different ones of the ports in the horizontal dimension, and may only use a unified sector-level forming in the vertical dimension. After an Active Antenna System (AAS) technique is introduced to a mobile communication system, the antenna system of the base station may obtain a larger freedom degree in the vertical dimension, and may optimize a signal at a UE level in a three-dimensional space.

Based on above research results, the standardization, and developments of antenna techniques, an industry is pushing the MIMO technique further forward in a direction of three-dimension and large scales. At present, 3GPP (3rd Generation Partnership Project) is engaged in a technical research and standardization of a Full Dimension MIMO (FD-MIMO). The academia is carrying out more forward-looking researches and tests for a MIMO technique which is based on larger-scale antenna arrays. A result based on academic researches and preliminary channel tests shows that a Massive MIMO technique may enhance a frequency-band utilization efficiency of a system significantly, and support a larger amount of users accessing to the system. Therefore, various research organizations take the Massive MIMO technique as a most prominent physical-layer technique in a next generation mobile communication system.

The Massive MIMO technique needs to use a massive antenna array. Although a fully digital array may maximize a spatial resolution and obtain a optimum MU-MIMO performance, such fully digital array needs a large quantity of A/D (analog/digital) converters and D/A (digital/analog) converters and a large number of complete RF-Baseband processing channels. Thus, a heavy burden exists in terms of device costs and baseband processing complexity. This problem is especially significant in a system configured with high frequency bands and larger bandwidths. In order to reduce the costs and complexity of the device using the Massive MIMO technique, a hybrid digital-analog beam-forming technique is given recently. The hybrid digital-analog beam-forming technique is a technique in which a stage of beam-forming processing is added to a RF signal at a front end near an antenna system based on a conventional digital beam-forming processing. An analog beam-forming processing may enable a rough match between a transmission signal and a channel in a simple manner. A dimension of equivalent channels formed after the analog beam-forming processing is smaller than an actual antenna amount, and thus the amount of A/D converters and D/A converters needed subsequently, a number of digital channels and baseband processing complexity may be greatly reduced. A residual interference in the analog beam-forming processing may be further processed in a digital domain, and thus a MU-MIMO transmission quality is ensured.

Compared with the fully digital beam-forming technique, the hybrid digital-analog beam-forming technique is a trade-off solution between a performance and the complexity, and has a higher application prospect in a system configured with high frequency bands, large bandwidths or a large amount of antennas.

In the MIMO technique, especially in the MU-MIMO technique, a precision of channel state information obtained by a network side may directly affect an accuracy of a precoding/beam-forming process and an effect of a scheduling algorithm, and thereby affect an overall performance of a system. Therefore, obtaining the channel state information is one of core issues in the standardization of the MIMO technique.

According to a structure of a current LTE signal, since a reference signal is arranged in the baseband, a channel state needed by the digital beam-forming may be obtained through channel estimation. However, since an amount of equivalent digital channels formed by the analog beam-forming is smaller than an actual antenna amount, a dimension of a channel matrix obtained through the reference signal is much less than a dimension of a complete channel matrix at antenna terminals. Therefore, the spatial resolution and an interference suppression capability achievable by the digital beam-forming are discounted. A processing of the analog beam-forming is closer to physical antennas, and thus MIMO channels of the analog beam-forming have a higher freedom as compared with those of the digital beam-forming. However, since the reference signal arranged in the baseband may not be estimated, the analog beam-forming in both an FDD (Frequency Division Duplex) system or in a TDD (Time Division Duplex) system may not directly use channel state information obtained in the digital domain.

Therefore, in a hybrid digital-analog beam-forming system, analog beams may generally be selected by a searching (or training) manner. In such selection procedure, a transmission end transmits a group of beams, a reception end also performs probing reception by using a group of predetermined beam so as to determine an optimum combination of transmission beams and reception beams. In a case that a channel condition is changed (such as a shielding happens), the system performs a beam searching procedure again, and a traversal search needs to be performed to possible combinations of transmission beams and reception beams.

For the hybrid digital-analog beam-forming system, a current beam searching and tracking procedure is performed basically in an analog domain and is used to select analog beams. A procedure of measuring and feeding back the channel state information in the digital domain is independent from that in the analog domain, and generally is performed after a training and tracking procedure of the analog beams, and measurement of the reference signal as well as the calculation and feedback of the channel state information are performed on an established combination of transmission beams and reception beams. Such two measurement and feedback mechanisms independent from each other and directed to the analog domain and the digital domain respectively bring large redundancy and system overheads.

SUMMARY

An objective of the present disclosure is to provide a beam scanning and search tracking method and a beam scanning and search tracking device, so as to solve a problem in the relevant art that measurement and feedback mechanisms for analog beams and measurement and feedback mechanisms for digital beams are independent from each other and large redundancy and system overheads exist is addressed.

To solve the above technical problem. a beam scanning and search tracking method applied to a first communication node is provided in the present disclosure and includes constructing analog beams and performing digital beam-forming to the analog beams so as to form equivalent beams; transmitting reference signals to a second communication node by using the equivalent beams; receiving beam information about the equivalent beams and corresponding channel state information fed back by the second communication node according to the reference signals; performing a beam scanning operation and a search tracking operation by using the beam information and the channel state information.

Optionally, the constructing the analog beams and the performing the digital beam-forming to the analog beams to form equivalent beams, includes: constructing the analog beams, weighting a group of reference signal ports by performing the digital beam-forming, constructing the analog beams as the equivalent beams by using the group of reference signal ports. The transmitting the reference signals to the second communication node by using the equivalent beams, includes: carrying the reference signals on the equivalent beams, and performing a beam scanning operation within a coverage range determined by the analog beams. The receiving beam information about the equivalent beams and corresponding channel state information fed back by the second communication node according to the reference signals, includes: receiving identifier information about one or more equivalent beams and the channel state information fed back by the second communication node, wherein a coverage range of the equivalent beams is smaller than a coverage range of the analog beams corresponding to the equivalent beams.

Optionally, the identifier information of the equivalent beams includes identifier information of analog beams corresponding to the equivalent beams; or the receiving beam information about the equivalent beams and corresponding channel state information fed back by the second communication node according to the reference signals, includes: receiving the identifier information of the analog beams fed back by the second communication node, wherein the identifier information of the analog beams corresponds to the identifier information of the equivalent beams.

Optionally, the constructing analog beams and the performing digital beam-forming to the analog beams to form equivalent beams, includes: constructing the analog beams, performing a transmit diversity processing and/or a weighting processing to digital ports; and constructing the analog beams as the equivalent beams by using the digital ports. The receiving beam information about the equivalent beams and corresponding channel state information fed back by the second communication node according to the reference signals, includes: receiving identifier information and/or signal strengths of one or more equivalent beams and channel quality indicators fed back by the second communication node.

Optionally, the constructing analog beams and the performing digital beam-forming to the analog beams to form equivalent beams, includes: constructing the analog beams, and performing the beam scanning operation.

Optionally, the beam scanning and search tracking method further includes performing an analog beam-forming operation to a group of reference signal ports according to one or more analog beams determined after performing the search tracking operation; transmitting, to the second communication node, reference signals outputted by the group of reference signal ports; receiving implicit feedback information or explicit feedback information fed back by the second communication node, wherein the implicit feedback information includes at least one of a Precoding Matrix Indicator (PMI), a Rank Indicator (RI), or a Channel Quality Indicator (CQI), and the explicit feedback information includes channel matrices or statistics information of the channel matrices after performing a quantization operation or a transformation operation.

Optionally, the transmitting, to the second communication node, reference signals outputted by the group of reference signal ports, includes: transmitting the reference signals by using the analog beams, wherein the analog beams are not scanned; or the performing the analog beam-forming operation to a group of reference signal ports according to one or more analog beams determined after performing the search tracking operation, includes: constructing a beam subset by taking the determined one or more analog beams as a center, and performing the analog beam-forming operation to a group of reference signal ports according to each analog beam in the beam subset. The transmitting, to the second communication node, reference signals outputted by the group of reference signal ports, includes: using the analog beams to carry the reference signals outputted by the group of reference signal ports, and performing the beam scanning operation within the coverage range formed by the beam subset.

Optionally, the beam scanning and search tracking method further includes: according to one or more analog beams determined after performing the search tracking operation, weighting a group of reference signal ports through digital beam-forming, and constructing the equivalent beams; using the equivalent beams to carry the reference signals outputted by the group of reference signal ports, and performing the beam scanning operation within a coverage range determined from the corresponding analog beams, and transmitting the reference signals to the second communication node; receiving identifier information of the one or more equivalent beams and channel state information fed back by the second communication node.

Optionally, the according to one or more analog beams determined after performing the search tracking operation, weighting the group of reference signal ports through the digital beam-forming, and constructing the equivalent beams, includes: according to one or more analog beams determined after performing the search tracking operation, weighting the group of reference signal ports through the digital beam-forming, and constructing each of the determined analog beams as an equivalent beam by using the group of reference signal ports; or constructing a beam subset by taking, as a center, the one or more analog beams determined after performing the search tracking operation, weighting the group of reference signal ports through the digital beam-forming; and constructing each of the one or more analog beams in the beam subset as the equivalent beam by using the group of reference signal ports.

Optionally, the identifier information of the equivalent beams includes identifier information of analog beams corresponding to the equivalent beams; or the beam scanning and search tracking method further includes: receiving the identifier information of the analog beams fed back by the second communication node, wherein the identifier information of the analog beams corresponds to the identifier information of the equivalent beams.

A beam scanning and search tracking method applied to a second communication node is further provided in the present disclosure and includes: receiving reference signals transmitted by a first communication node through constructed equivalent beams; measuring the reference signals and obtaining beam information about the equivalent beams satisfying a recommendation condition and corresponding channel state information; and feeding the beam information and the corresponding channel state information back to the first communication node.

Optionally, the receiving the reference signals transmitted by the first communication node through the constructed equivalent beams, includes: receiving the reference signals transmitted by the first communication node through equivalent beam scanning. The measuring the reference signals and obtaining beam information about the equivalent beams satisfying a recommendation condition and corresponding channel state information, includes: measuring the reference signals and obtaining identifier information of the equivalent beams satisfying the recommendation condition and the corresponding channel state information.

Optionally, the identifier information of the equivalent beams includes identifier information of analog beams corresponding to the equivalent beams; or the measuring the reference signals and obtaining the beam information about the equivalent beams satisfying the recommendation condition and the corresponding channel state information, includes: measuring the reference signals and obtaining identifier information of analog beams corresponding to the equivalent beams satisfying the recommendation condition.

Optionally, the receiving the reference signals transmitted by the first communication node through the constructed equivalent beams includes: receiving the reference signals transmitted through the equivalent beams by the first communication node, wherein the equivalent beams are not scanned. The measuring the reference signals and the obtaining beam information about the equivalent beams satisfying the recommendation condition and corresponding channel state information, includes: measuring the reference signals and obtaining identifier information and/or signal strengths of the equivalent beams satisfying the recommendation condition and corresponding channel quality indicators.

Optionally, the receiving the reference signals transmitted through the constructed equivalent beams by the first communication node includes: receiving the reference signals transmitted through the constructed equivalent beams by the first communication node and the reference signals transmitted through the analog beams corresponding to the equivalent beams.

Optionally, the beam scanning and search tracking method further includes: receiving the reference signals transmitted by the first communication node through the analog beams determined according to the beam information; measuring the reference signals and obtaining implicit feedback information or explicit feedback information corresponding to the analog beams; feeding back the implicit feedback information or the explicit feedback information to the first communication node, wherein the implicit feedback information includes at least one of a Precoding Matrix Indicator (PMI), a Rank Indicator (RI), or a channel quality indicator (CQI), and the explicit feedback information includes channel matrices or statistics information of the channel matrices after performing a quantization operation or a transformation operation.

Optionally, the receiving the reference signals transmitted by the first communication node through the analog beams determined according to the beam information, includes: receiving the reference signals transmitted through the determined analog beams by the first communication node, wherein the analog beams are not scanned; or receiving the reference signals transmitted by the first communication node through a determined analog-beam scanning manner.

Optionally, the beam scanning and search tracking method further includes: receiving the reference signals transmitted by the first communication node through the equivalent beams constructed according to the determined analog beams; measuring the reference signals and obtaining beam information about the equivalent beams satisfying the recommendation condition and corresponding channel state information; feeding back the beam information about the equivalent beams and the channel state information to the first communication node.

Optionally, the receiving the reference signals transmitted by the first communication through the equivalent beams constructed according to determined analog beams, includes: receiving the reference signals transmitted by the first communication node through the equivalent beams constructed from a group of reference signal ports, wherein the group of reference signal ports is weighted through digital beam-forming according to determined one or more analog beams; or receiving the reference signals transmitted by the first communication node through the equivalent beams constructed from a group of reference signal ports, wherein a beam subset is constructed by taking determined one or more analog beams as a center, and the group of reference signal ports is weighted through the digital beam-forming according to each analog beam in the beam set.

Optionally, the identifier information of the equivalent beams includes identifier information of analog beams corresponding to the equivalent beams; or the beam scanning and search tracking method further includes: measuring the reference signals and obtaining identifier information of analog beams corresponding to equivalent beams satisfying the recommendation condition; feeding back the identifier information of the analog beams to the first communication node.

A beam scanning and search tracking device applied to a first communication node is further provided in the present disclosure and includes: a first processing module, configured for constructing analog beams and performing digital beam-forming to the analog beams so as to form equivalent beams; a first transmission module, configured for transmitting reference signals to a second communication node by using the equivalent beams; a first reception module, configured for receiving beam information about the equivalent beams and corresponding channel state information fed back by the second communication node according to the reference signals; and a second processing module, configured for performing a beam scanning operation and a search tracking operation by using the beam information and the channel state information.

Optionally, the first processing module includes: a first construction sub-module configured for constructing the analog beams; a first processing sub-module configured for weighting a group of reference signal ports by performing the digital beam-forming; and a second construction sub-module configured for constructing the analog beams as the equivalent beams by using the group of reference signal ports. The first transmission module includes: a first scanning sub-module, configured for carrying the reference signals on the equivalent beams, and performing a beam scanning operation within a coverage range determined by the analog beams. The first reception module includes: a first reception sub-module configured for receiving identifier information about one or more equivalent beams and channel state information fed back by the second communication node; wherein a coverage range of the equivalent beams is smaller than a coverage range of the analog beams corresponding to the equivalent beams.

Optionally, the identifier information of the equivalent beams includes identifier information of analog beams corresponding to the equivalent beams; or the first reception module further includes a second reception sub-module configured for receiving the identifier information of the analog beams fed back by the second communication node, wherein the identifier information of the analog beams corresponds to the identifier information of the equivalent beams.

Optionally, the first processing module includes: a third construction sub-module configured for constructing the analog beams; a second processing sub-module configured for performing a transmit diversity processing and/or a weighting processing to digital ports; and a fourth construction sub-module configured for constructing the analog beams as the equivalent beams by using the digital ports. The first reception module includes: a third reception sub-module, configured for a third reception sub-module, configured for receiving identifier information and/or signal strengths of one or more equivalent beams and channel quality indicators fed back by the second communication node.

Optionally, the first processing module includes: a third processing sub-module, configured for constructing the analog beams and performing the beam scanning operation.

Optionally, the beam scanning and search tracking device further includes: a beam-forming module configured for performing an analog beam-forming operation to a group of reference signal ports according to one or more analog beams determined after performing the search tracking operation; a second transmission module configured for transmitting, to the second communication node, reference signals outputted by the group of reference signal ports; a second reception module configured for receiving implicit feedback information or explicit feedback information fed back by the second communication node, wherein the implicit feedback information includes at least one of a Precoding Matrix Indicator (PMI), a Rank Indicator (RI), or a Channel Quality Indicator (CQI), and the explicit feedback information includes channel matrices or statistics information of the channel matrices after performing a quantization operation or a transformation operation.

Optionally, the second transmission module includes: a transmission sub-module configured for transmitting the reference signals by using the analog beams, wherein the analog beams are not scanned; or the beam-forming module includes: a fifth construction sub-module configured for constructing a beam subset by taking, as a center, determined one or more analog beams; a beam-forming sub-module configured for performing an analog beam-forming operation to a group of reference signal ports according to each analog beam in the beam subset. The second transmission module includes: a second scanning submodule configured for using the analog beams to carry the reference signals outputted by the group of reference signal ports, and performing the beam scanning operation within a coverage range formed by the beam subset.

Optionally, the beam scanning and search tracking device further includes a third processing module configured for, according to one or more analog beams determined after performing the search tracking operation, weighting a group of reference signal ports through digital beam-forming, and constructing the equivalent beams; a fourth processing module configured for using the equivalent beams to carry the reference signals outputted by the group of reference signal ports, and performing the beam scanning operation within a coverage range determined from corresponding analog beams, and transmitting the reference signals to the second communication node; and a third reception module configured for receiving identifier information of the one or more equivalent beams and channel state information fed back by the second communication node.

Optionally, the third processing module includes: a fourth processing sub-module configured for according to one or more analog beams determined after performing the search tracking operation, weighting the group of reference signal ports through the digital beam-forming; a sixth construction sub-module configured for constructing each of the determined one or more analog beams as the equivalent beams by using the group of reference signal ports; or the third processing module includes: a seventh construction sub-module configured for constructing a beam subset by taking, as a center, one or more analog beams determined after performing the search tracking operation; a fifth processing sub-module configured for weighting the group of reference signal ports through the digital beam-forming; and an eighth construction sub-module configured for constructing each analog beam in the beam subset as the equivalent beams by using the group of reference signal ports.

Optionally, the identifier information of the equivalent beams includes identifier information of analog beams corresponding to the equivalent beams; or the beam scanning and search tracking device further includes: a fourth reception module configured for receiving the identifier information of the analog beams fed back by the second communication node, wherein the identifier information of the analog beams corresponds to the identifier information of the equivalent beams.

A beam scanning and search tracking device applied to a second communication node is further provided in the present disclosure and includes: a fifth reception module configured for receiving reference signals transmitted by a first communication node through constructed equivalent beams; a fifth processing module configured for measuring the reference signals and obtaining beam information about the equivalent beams satisfying a recommendation condition and corresponding channel state information; a first feedback module configured for feeding the beam information and the channel state information back to the first communication node.

Optionally, the fifth reception module includes a fourth reception sub-module configured for receiving the reference signals transmitted by the first communication node through equivalent beam scanning. The fifth processing module includes a sixth processing sub-module configured for measuring the reference signals and obtaining identifier information of the equivalent beams satisfying the recommendation condition and the corresponding channel state information.

Optionally, the identifier information of the equivalent beams includes identifier information of analog beams corresponding to the equivalent beams; or the fifth processing module further includes: a seventh processing sub-module configured for measuring the reference signals and obtaining identifier information of analog beams corresponding to the equivalent beams satisfying the recommendation condition.

Optionally, the fifth reception module includes: a fifth reception sub-module configured for receiving the reference signals transmitted through the equivalent beams by the first communication node, wherein the equivalent beams are not scanned. The fifth processing module includes: an eighth processing sub-module configured for measuring the reference signals and obtaining identifier information and/or signal strengths of the equivalent beams satisfying the recommendation condition and corresponding channel quality indicators.

Optionally, the fifth reception module includes: a sixth reception sub-module configured for receiving the reference signals transmitted through the constructed equivalent beams by the first communication node, and the reference signals transmitted through the analog beams corresponding to the equivalent beams.

Optionally, the beam scanning and search tracking device further includes: a sixth reception module configured for receiving the reference signals transmitted by the first communication node through the analog beams determined according to the beam information; a sixth processing module configured for measuring the reference signals and obtaining implicit feedback information or explicit feedback information corresponding to the analog beams; a second feedback module configured for feeding back the implicit feedback information or the explicit feedback information to the first communication node, wherein the implicit feedback information includes at least one of a Precoding Matrix Indicator (PMI), a Rank Indicator (RI), or a channel quality indicator (CQI), and the explicit feedback information includes channel matrices or statistics information of the channel matrices after performing a quantization operation or a transformation operation.

Optionally, the sixth reception module includes: a seventh reception sub-module configured for receiving the reference signals transmitted through the determined analog beams by the first communication node, wherein the analog beams are not scanned; or an eighth reception sub-module configured for receiving the reference signals transmitted by the first communication node through a determined analog-beam scanning manner.

Optionally, the beam scanning and search tracking device further includes: a seventh reception module configured for receiving the reference signals transmitted by the first communication node through the equivalent beams constructed according to the determined analog beams; a seventh processing module configured for measuring the reference signals and obtaining beam information about the equivalent beams satisfying the recommendation condition and corresponding channel state information; a third feedback module configured for feeding back the beam information about the equivalent beams and the channel state information to the first communication node.

Optionally, the seventh reception module includes: a ninth reception sub-module configured for receiving the reference signals transmitted by the first communication node through the equivalent beams constructed from a group of reference signal ports, wherein the group of reference signal ports is weighted through digital beam-forming according to the determined one or more analog beams; or a tenth reception sub-module configured for receiving the reference signals transmitted by the first communication node through the equivalent beams constructed from a group of reference signal ports, wherein a beam subset is constructed by taking the determined one or more analog beams as a center, and the group of reference signal ports is weighted through the digital beam-forming according to each analog beam in the beam set.

Optionally, the identifier information of the equivalent beams includes identifier information of analog beams corresponding to the equivalent beams; or the beam scanning and search tracking device further includes: an eighth processing module configured for measuring the reference signals and obtaining identifier information of analog beams corresponding to equivalent beams satisfying the recommendation condition; and a fourth feedback module configured for feeding back the identifier information of the analog beams to the first communication node.

A first communication node is further provided in the present disclosure and includes a transceiver, a processor and a storage, wherein the processor is configured for, through performing programs or data stored in the storage, constructing analog beams and performing digital beam-forming to the analog beams so as to form equivalent beams; the transceiver is configured for transmitting reference signals to a second communication node by using the equivalent beams, and receiving beam information about the equivalent beams and corresponding channel state information fed back by the second communication node according to the reference signals; the processor is further configured for performing a beam scanning operation and a search tracking operation by using the beam information and the channel state information received through the transceiver.

A second communication node is further provided in the present disclosure and includes a transceiver, a processor and a storage, wherein the transceiver is configured for receiving reference signals transmitted by a first communication node through constructed equivalent beams; the processor is configured for, through performing programs or data stored in the storage, measuring the reference signals and obtaining beam information about the equivalent beams satisfying a recommendation condition and corresponding channel state information, and feeding the beam information and the corresponding channel state information back to the first communication node.

The above technical solutions of the present disclosure are advantageous in the following.

In above solutions, the beam scanning and search tracking method transmits the reference signal to the second communication node by using the constructed equivalent beams and receives the information fed back by the second communication node according to the reference signals, and further completes the beam scanning operation and search tracking operation, and an objective of obtaining the channel state information needed by digital beam-forming is achieved when alignment of the analog beams is performed with the second communication node. That is, measuring and feeding back the channel state information (CSI) in the digital domain are combined effectively with searching analog beams, and unnecessary operations are greatly reduced and system overheads are reduced correspondingly.

DETAILED DESCRIPTION

To make technical problems to be solved, technical solutions, and advantages of the present disclosure more apparent, specific embodiments will be described hereinafter in detail in combination with the drawings.

Directed to a problem in relevant art that the measurement and feedback mechanisms for analog beams and digital beams are independent from each other and large redundancy and system overheads exist, the present disclosure provides multiple solutions as follow.

First Embodiment

Figure 1:
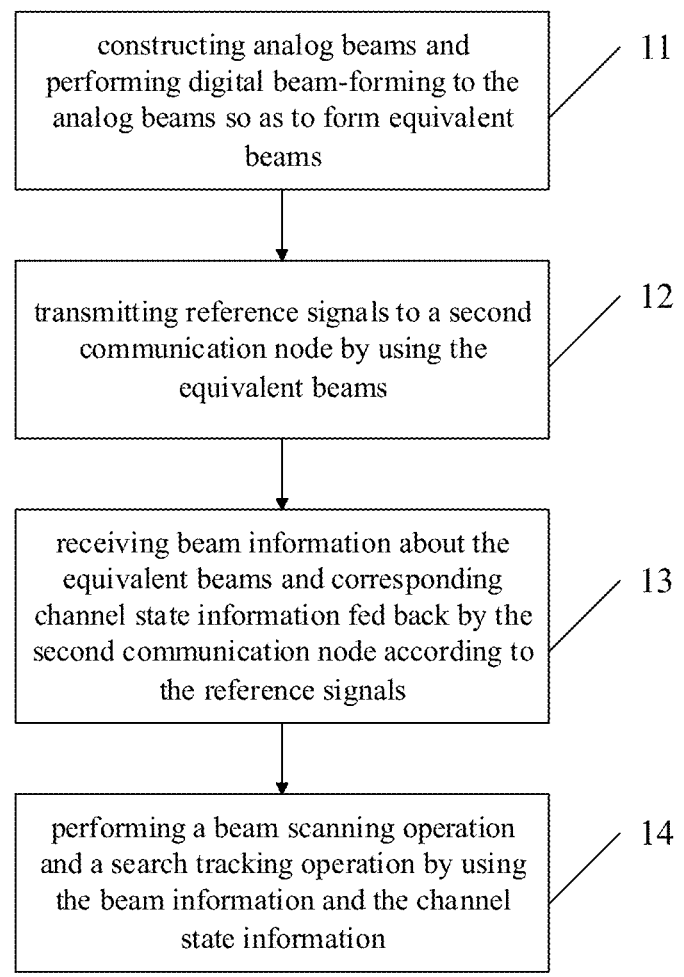
FIG. 1 is a flowchart of a beam scanning and search tracking method according to a first embodiment of the present disclosure.

As shown in FIG. 1, the first embodiment of the present disclosure provides a beam scanning and search tracking method. The method is applied to a first communication node. The method includes steps 11-14.

Step 11: constructing analog beams and performing digital beam-forming to the analog beams so as to form equivalent beams;

Step 12: transmitting reference signals to a second communication node by using the equivalent beams;

Step 13: receiving beam information about the equivalent beams and corresponding channel state information fed back by the second communication node according to the reference signals;

Step 14: performing a beam scanning operation and a search tracking operation by using the beam information and the channel state information.

The beam scanning and search tracking method provided in the first embodiment of the present disclosure transmits the reference signal to the second communication node by using the constructed equivalent beams and receives the information fed back by the second communication node according to the reference signals, and further completes the beam scanning and search tracking operation, and an objective of obtaining the channel state information needed by a digital beam-forming is achieved when alignment of the analog beams is performed with the second communication node. That is, measuring and feeding back the channel state information (CSI) in the digital domain are combined effectively with searching analog beams, and unnecessary operations are greatly reduced and system overheads are reduced correspondingly.

The step 11 may be implemented in following two ways.

First way, the step 11 of constructing the analog beams and performing the digital beam-forming to the analog beams to form equivalent beams, includes: constructing the analog beams, and weighting a group of reference signal ports by performing the digital beam-forming; and constructing the analog beams as the equivalent beams by using the reference signal ports.

Accordingly, the step 12 of transmitting the reference signals to the second communication node by using the equivalent beams, includes: carrying the reference signals on the equivalent beams, and performing a beam scanning operation within a coverage range determined by the analog beams.

The step 13 of receiving beam information about the equivalent beams and corresponding channel state information fed back by the second communication node according to the reference signals, includes: receiving identifier information about one or more equivalent beams and the channel state information fed back by the second communication node; wherein a coverage range of the equivalent beams is smaller than a coverage range of the analog beams corresponding to the equivalent beams.

The constructing analog beams is an operation in an analog domain and forms the analog beams. A specific procedure of the constructing analog beams may be performed by using methods in the relevant art and will not be repeated herein.

The channel state information may include a PMI, a RI and a corresponding CQI.

The beam scanning operation performed by using the equivalent beams may be performed periodically or non-periodically. Specific configuration parameters may be indicated by the first communication node or a network, or performed in a predetermined way.

Optionally, the identifier information of the equivalent beams includes identifier information of analog beams corresponding to the equivalent beams; or the step 13 of receiving beam information about the equivalent beams and corresponding channel state information fed back by the second communication node according to the reference signals, includes: receiving the identifier information of the analog beams fed back by the second communication node, wherein the identifier information of the analog beams corresponds to the identifier information of the equivalent beams.

The analog beams being fed back correspond to the equivalent beams being fed back.

Second way, the step 11 of constructing analog beams and performing digital beam-forming to the analog beams to form equivalent beams, includes: constructing the analog beams, and performing a transmit diversity processing and/or a weighting processing to digital ports; and constructing the analog beams as the equivalent beams by using the digital ports.

Correspondingly, the step 13 of receiving beam information about the equivalent beams and corresponding channel state information fed back by the second communication node according to the reference signals, includes: receiving identifier information and/or signal strengths of one or more equivalent beams and a channel quality index fed back by the second communication node; wherein difference between a coverage range of the equivalent beams and a coverage range of the analog beams corresponding to the equivalent beams is smaller than a predetermined threshold.

The constructing analog beams is an operation in the analog domain and forms the analog beams. A specific procedure of the constructing analog beams may be performed by using a method in the relevant art and will not be repeated herein.

The transmit diversity performed to the digital ports may be techniques such as a Frequency Switch Transmit Diversity (FSTD) or Space Frequency Block Code (SFBC) or the like.

The weighting processing performed to the digital ports may generate beams that are relatively wide.

The reference signals transmitted to the second communication node by using the equivalent beams may be performed periodically or non-periodically. Specific configuration parameters may be indicated by the first communication node or a network, or performed in a predetermined way.

Further, the step 11 of constructing analog beams and performing digital beam-forming to the analog beams to form equivalent beams, includes: constructing the analog beams, and performing the beam scanning operation.

This step may be understood as a common selection procedure (i.e. a search tracking operation) of analog beams.

In order to obtain more accurate results, the embodiment further provides two measures.

First measure, the beam scanning and search tracking method further includes: performing an analog beam-forming operation to a group of reference signal ports according to one or more analog beams determined after performing the search tracking operation; transmitting, to the second communication node, reference signals outputted by the group of reference signal ports; receiving implicit feedback information or explicit feedback information fed back by the second communication node, wherein the implicit feedback information includes at least one of a Precoding Matrix Indicator (PMI), a Rank Indicator (RI), or a Channel Quality Indicator (CQI), and the explicit feedback information includes channel matrices or statistics information of the channel matrices after performing a quantization operation or a transformation operation.

The channel matrices may be complete matrices, or parts of sub-matrices, or may be parts of components. The statistics information may include at least one of correlation matrices, eigenvectors, or eigenvalues.

The transmitting, to the second communication node, reference signals outputted by the group of reference signal ports, includes: transmitting the reference signals by using the analog beams, wherein the analog beams are not scanned. Optionally, the performing the analog beam-forming operation to a group of reference signal ports according to one or more analog beams determined after performing the search tracking operation, includes: constructing a beam subset by taking the determined one or more analog beams as a center; and performing the analog beam-forming operation to a group of reference signal ports according to each analog beam in the beam subset. Accordingly, the transmitting, to the second communication node, reference signals outputted by the group of reference signal ports, includes: using the analog beams to carry the reference signals outputted by the reference signal ports, and performing the beam scanning operation within the coverage range formed by the beam subset.

Second measure: the beam scanning and search tracking method further includes: according to one or more analog beams determined after performing the search tracking operation, weighting a group of reference signal ports through the digital beam-forming technique and constructing the equivalent beams; using the equivalent beams to carry the reference signals outputted by the reference signal ports, and performing the scanning operation within the coverage range determined from the corresponding analog beams, and transmitting the reference signals to the second communication node; receiving the identifier information of the one or more equivalent beams and the channel state information fed back by the second communication node; wherein a coverage range of the equivalent beams is smaller than a coverage range of the analog beams corresponding to the equivalent beams.

The channel state information herein may include the PMI, the RI and the corresponding CQI.

The scanning operation performed by using the equivalent beams may be performed periodically or non-periodically. Specific configuration parameters may be indicated by the first communication node or the network, or performed in a predetermined way.

Specifically, the weighting the group of reference signal ports through the digital beam-forming technique according to one or more analog beams determined after performing the search tracking operation, and constructing the equivalent beams, includes: weighting the group of reference signal ports through the digital beam-forming technique according to one or more analog beams determined after performing the search tracking operation; and constructing each determined analog beam as the equivalent beams by using the reference signal ports; or constructing a beam subset by taking, as a center, one or more analog beams determined after performing the search tracking operation; weighting the group of reference signal ports through the digital beam-forming technique; and constructing each analog beam in the beam subset as the equivalent beam by using the reference signal ports.

Further, the identifier information of the equivalent beams includes identifier information of analog beams corresponding to the equivalent beams. Optionally, the beam scanning and search tracking method further includes: receiving the identifier information of the analog beams fed back by the second communication node, wherein the identifier information of the analog beams corresponds to the identifier information of the equivalent beams.

In view of the above, the beam scanning and search tracking method provided in the embodiments of the present disclosure combines scanning analog beams with measuring and feeding back digital CSIs, and the problem in relevant art that the measurement and feedback mechanism for analog beams and the measurement and feedback mechanism for digital beams are independent from each other and large redundancy and system overheads exist is addressed.

Second Embodiment

Figure 2:
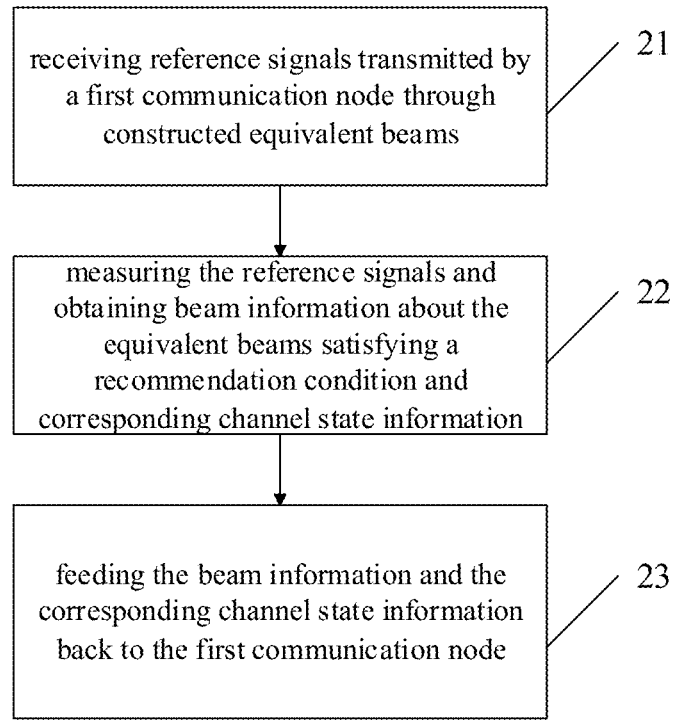
FIG. 2 is a flowchart of the beam scanning and search tracking method according to a second embodiment of the present disclosure.

As shown in FIG. 2, the second embodiment of the present disclosure provides a beam scanning and search tracking method which is applied in a second communication node. The method includes steps 21-23.

Step 21: receiving reference signals transmitted by a first communication node through constructed equivalent beams;

Step 22: measuring the reference signals and obtaining beam information about the equivalent beams satisfying a recommendation condition and corresponding channel state information;

Step 23: feeding the beam information and the corresponding channel state information back to the first communication node.

The feeding back in the step 23 may be performed periodically or non-periodically. Specific configuration parameters may be indicated by the first communication node or a network, or performed in a predetermined way.

In the beam scanning and search tracking method provided in the second embodiment of the present disclosure, the reference signals transmitted by the first communication node are received, and the beam information about the equivalent beams satisfying the recommendation condition and the corresponding channel state information are obtained through measurement and are fed back, so that an objective of obtaining the channel state information needed by the digital beam-forming is achieved when the first communication node performs alignment of the analog beams with the second communication node. That is, measuring and feeding back the channel state information (CSI) in the digital domain are combined effectively with searching analog beams, and unnecessary operations are greatly reduced and system overheads are reduced correspondingly.

The step 21 may be implemented in following two ways.

First way, the step of receiving the reference signals transmitted by the first communication node through the constructed equivalent beams includes: receiving the reference signals transmitted by the first communication node through equivalent beam scanning.

Correspondingly, the step of measuring the reference signals and obtaining beam information about the equivalent beams satisfying the recommendation condition and corresponding channel state information, includes: measuring the reference signals and obtaining identifier information of the equivalent beams satisfying the recommendation condition and the corresponding channel state information.

Optionally, the identifier information of the equivalent beams includes identifier information of analog beams corresponding to the equivalent beams; or the step of measuring the reference signals and obtaining the beam information about the equivalent beams satisfying the recommendation condition and the corresponding channel state information, includes: measuring the reference signals and obtaining identifier information of analog beams corresponding to the equivalent beams satisfying the recommendation condition.

Second way, the step of receiving the reference signals transmitted by the first communication node through the constructed equivalent beams includes: receiving the reference signals transmitted through the equivalent beams by the first communication node, wherein the equivalent beams are not scanned.

Correspondingly, the step of measuring the reference signals and obtaining beam information about the equivalent beams satisfying the recommendation condition and corresponding channel state information, includes: measuring the reference signals and obtaining identifier information and/or signal strengths of the equivalent beams satisfying the recommendation condition and the corresponding channel quality indicator.

Further, the step of receiving the reference signals transmitted through the constructed equivalent beams by the first communication node includes: receiving the reference signals transmitted through the constructed equivalent beams by the first communication node and the reference signals transmitted through the analog beams corresponding to the equivalent beams.

In order to obtain more accurate results, the embodiment further provides two measures.

First measure, the beam scanning and search tracking method further includes: receiving the reference signals transmitted by the first communication node through the analog beams determined according to the beam information; measuring the reference signals and obtaining an implicit feedback information or explicit feedback information corresponding to the analog beams; feeding back the implicit feedback information or the explicit feedback information to the first communication node, wherein the implicit feedback information includes at least one of a Precoding Matrix Indicator (PMI), a Rank Indicator (RI), or a channel quality indicator (CQI), and the explicit feedback information includes channel matrices or statistics information of the channel matrices after performing a quantization operation or a transformation operation.

The feeding back in the step 23 may be performed periodically or non-periodically. Specific configuration parameters may be indicated by the first communication node or a network, or performed in a predetermined way.

The channel matrices may be complete matrices, or parts of sub-matrices, or may be parts of components. The statistics information may include at least one of correlation matrices, eigenvectors, or eigenvalues.

The step of receiving the reference signals transmitted by the first communication node through the analog beams determined according to the beam information, includes: receiving the reference signals transmitted through the determined analog beams by the first communication node, wherein the analog beams are not scanned; or receiving the reference signals transmitted by the first communication node through a determined analog-beam scanning manner.

Second measure, the beam scanning and search tracking method further includes: receiving the reference signals transmitted by the first communication node through the equivalent beams constructed according to the determined analog beams; measuring the reference signals and obtaining beam information about the equivalent beams satisfying a recommendation condition and corresponding channel state information; feeding back the beam information about the equivalent beams and the channel state information to the first communication node.

The feeding back in the step 23 may be performed periodically or non-periodically. Specific configuration parameters may be indicated by the first communication node or a network, or performed in a predetermined way.

Specifically, the step of receiving the reference signals transmitted by the first communication through the equivalent beams constructed according to determined one or more analog beams, includes: receiving the reference signals transmitted by the first communication node through the equivalent beams constructed from a group of reference signal ports, wherein the group of reference signal ports are weighted through digital beam-forming according to the determined one or more analog beams; or receiving the reference signals transmitted by the first communication node through the equivalent beams constructed from the group of reference signal ports, wherein a beam subset is constructed by taking the determined one or more analog beams as a center, and the group of reference signal ports are weighted through the digital beam-forming according to each analog beam in the beam set.

Further, the identifier information of the equivalent beams includes identifier information of analog beams corresponding to the equivalent beams; or the beam scanning and search tracking method further includes: measuring the reference signals and obtaining identifier information of analog beams corresponding to equivalent beams satisfying recommendation conditions; feeding back the identifier information of the analog beams to the first communication node.

In view of the above, the beam scanning and search tracking method provided in the embodiments of the present disclosure combines analog beam scanning with digital CSI measurement and feedback, and the problem in relevant art that the measurement and feedback mechanisms for analog beams and the measurement and feedback mechanisms for digital beams are independent from each other and large redundancy and system overheads exist is addressed.

The beam scanning and search tracking method provided in the embodiment of the present disclosure will be further described hereinafter in respect of the first communication node (called a communication A hereinafter) and the second communication node (called a communication B hereinafter).

Generally, the present disclosure effectively combines an analog-beam scanning procedure with a CSI measurement and feedback procedure in a digital domain, so as to reduce unnecessary operations and corresponding system overhead. Specifically, solutions of the present disclosure include two parts as follow:

A first part includes two specific examples used to determine analog beams and obtain the channel state information needed by the digital beam-forming.

First Example 1) the communication node A constructs the analog beams through operations in the analog domain, and performs the beam scanning procedure in a certain range (in a beam range constructed according to a predetermined rule such as a distance rule);

2) based on the analog beams constructed in above analog beam-forming operations and in case that the above beam scanning procedure uses each of the analog beams, the communication node A further weights a group of reference signal ports (such as CSI-RS) through the digital beam-forming. Finally, a beam scanning operation is performed to equivalent beams carrying the reference signals and formed through hybrid digital-analog beam-forming operations, within the beam range determined for each of the analog beams;

3) the communication node B measures the reference signals, feeds back to the communication node A identifier information corresponding to one or more hybrid digital-analog equivalent beams recommended by the communication node B (recommended according to parameters such as signal strengths, signal noise ratios, or the like), calculates and reports a PMI, a RI and a CQI corresponding to the hybrid digital-analog equivalent beams being recommended. The communication node B may also report identifier information of analog beams corresponding to the one or more hybrid digital-analog equivalent beams recommended by the communication node B, or the information may be implicitly included in the identifier information corresponding to the one or more hybrid digital-analog equivalent beams recommended by the communication node B;

4) the above beam scanning procedure may be performed periodically or non-periodically. Specific parameter configuration for the procedure may be indicated by the communication node A or a network side or be determined according to a predetermined manner;

5) the information in the step 3) may be reported periodically or non-periodically. Specific parameter configuration for the beam scanning procedure may be indicated by the communication node A or a network side or be determined according to a predetermined manner.

Second Example

Besides manners in the first example, operations in the first part may also be performed in following manners:

1) the communication node A constructed the analog beams through operations in the analog domain, and performs the beam scanning operation in a certain range (in a beam range constructed according to a predetermined rule such as a distance rule);

2) based on the analog beams constructed by the analog beam-forming and in case that each of the analog beams is used in the above beam scanning operation, certain operations may be performed to the reference signals from digital ports so that the equivalent beams constructed finally, carrying the reference signals and processed in the analog domain and the digital domain have coverage ranges similar to those of sole analog beams, for example:

a. performing a transmit diversity procedure (such as FSTD or SFBC or the like) at digital ports (directional patterns of the digital ports are determined by the analog beams);

b. the digital ports may be weighted and relatively wide beams may be constructed by designing specific weighting values;

3) the communication node B measures the reference signals, feeds back to the communication node A identifier information corresponding to one or more equivalent beams recommended by the communication node B, or the communication node B may also report signal strengths corresponding to the equivalent beams;

4) the above beam scanning procedure may be performed periodically or non-periodically. Specific parameter configuration for the procedure may be indicated by the communication node A or a network side or be determined according to a predetermined manner;

5) the information in the step 3) may be reported periodically or non-periodically. Specific parameter configuration for the beam scanning procedure may be indicated by the communication node A or a network side or be determined according to a predetermined manner.

A second part includes four specific examples and is used to obtain more accurate channel state information needed by the digital beam-forming.

The two examples in the first part may be used separately or be combined with any example in the second part.

However, a fourth example in the second part is preferentially combined with the second example in the first part.

First Example 1) the first communication A performs analog beam-forming to a group of reference signal ports (such as the CSI-RS) according to the one or more analog beams determined in the first part. With respect to the reference signals, dynamic spatial-domain weighting procedures (such as dynamic beam-forming or pre-coding procedures) are not performed in the digital domain;

2) the communication B measures the reference signals, and calculates and reports the channel state information such as the PMI, the RI, the CQI or the like (implicit feedback information); or explicit feedback information (channel matrices (or sub-matrices or sub-components of the channel matrices) or some statistic parameters of the explicit feedback information (such as correlation matrices, eigenvectors, eigenvalues, or the like)) are quantized or transformed, and then are reported;

3) the procedure that the communication node A transmits the reference signals may be performed periodically or non-periodically. Specific parameter configuration for the procedure may be indicated by the communication node A or a network side or be determined according to a predetermined manner;

4) the information in the step 2) may be reported periodically or non-periodically. Specific parameter configuration for the information may be indicated by the communication node A or a network side or be determined according to a predetermined manner.

Second Example 1) the communication node A performs a beam scanning procedure to a subset of an available analog-beam set in a narrow range (a range covered by the analog-beam set) by taking, as a center, the one or more analog beams determined in the first part;

2) the first communication A performs the analog beam-forming to a group of reference signal ports (such as the CSI-RS) according to each of the analog beams used in the beam scanning procedure. With respect to the reference signals, dynamic spatial-domain weighting procedures (such as dynamic beam-forming or pre-coding procedures) are not performed in the digital domain;

3) the communication B measures the reference signals, and calculates and reports the channel state information such as the PMI, the RI, the CQI or the like; or explicit feedback information (channel matrices (or sub-matrices or sub-components of the channel matrices) or some statistic parameters of the explicit feedback information (such as correlation matrices, eigenvectors, eigenvalues, or the like)) are quantized or transformed, and then are reported;

4) the procedure that the communication node A transmits the reference signals may be performed periodically or non-periodically. Specific parameter configuration for the procedure may be indicated by the communication node A or a network side, or be determined according to a predetermined manner;

5) the information in the step 3) may be reported periodically or non-periodically. Specific parameter configuration for the information may be indicated by the communication node A or a network side or be determined according to a predetermined manner.

Third Example 1) the communication node A performs a beam scanning procedure to a subset of an available analog-beam set in a narrow range by taking, as a center, the one or more analog beams determined in the first part;

2) with respect to each of the analog beams used in the above beam scanning procedure, the communication node A further weights a group of reference signal ports (such as the CSI-RS) through the digital beam-forming operation. Finally, a beam scanning operation is performed to the equivalent beams carrying the reference signals and constructed through the hybrid digital-analog beam-forming operation, within the beam range determined by each of the analog beams;

3) the communication node B measures the reference signals, feeds back to the communication node A identifier information corresponding to one or more hybrid digital-analog equivalent beams recommended by the communication node B, calculates and reports the PMI, the RI and the CQI corresponding to the hybrid digital-analog equivalent beams recommended by the communication node B. The communication node B may also report identifier information of analog beams corresponding to the one or more hybrid digital-analog equivalent beams recommended by the communication node B, or the information may be implicitly included in the identifier information corresponding to the one or more hybrid digital-analog equivalent beams recommended by the communication node B;

4) the procedure that the communication node A transmits the reference signals may be performed periodically or non-periodically. Specific parameter configuration for the procedure may be indicated by the communication node A or a network side or be determined according to a predetermined manner;

5) the information in the step 3) may be reported periodically or non-periodically. Specific parameter configuration for the information may be indicated by the communication node A or a network side or be determined according to a predetermined manner.

Fourth Example 1) based on the one or more analog beams determined in the first part, the communication node A further weights a group of reference signal ports (such as the CSI-RS) through the digital beam-forming technique. Finally, a beam scanning operation is performed to the equivalent beams carrying the reference signals and constructed through a hybrid digital-analog beam-forming processing, within the beam range determined for each of the analog beams;

2) the communication node B measures the reference signals, feeds back to the communication node A identifier information corresponding to one or more hybrid digital-analog equivalent beams recommended by the communication node B, calculates and reports the PMI, the RI and the CQI corresponding to the hybrid digital-analog equivalent beams recommended by the communication node B.

3) the procedure that the communication node A transmits the reference signals may be performed periodically or non-periodically. Specific parameter configuration for the procedure may be indicated by the communication node A or a network side or be determined according to a predetermined manner;

4) the information in the step 2) may be reported periodically or non-periodically. Specific parameter configuration for the information may be indicated by the communication node A or a network side or be determined according to a predetermined manner.

In view of the above, the beam scanning and search tracking method provided in the embodiments of the present disclosure combines the analog beam scanning with the digital CSI measurement and feedback, and the problem in relevant art that the measurement and feedback mechanisms for analog beams and the measurement and feedback mechanisms for digital beams are independent from each other and large redundancy and system overheads exist is addressed.

Third Embodiment

Figure 3:
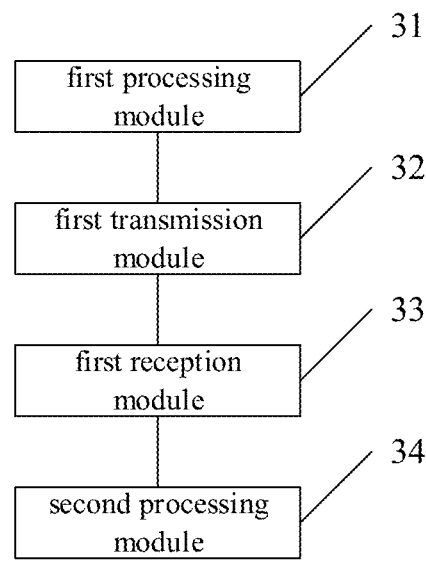
FIG. 3 is a structural schematic diagram of a beam scanning and search tracking device according to a third embodiment of the present disclosure.

As shown in FIG. 3, the third embodiment of the present disclosure provides a beam scanning and search tracking device applied in a first communication node. The beam scanning and search tracking device includes: a first processing module 31, configured for constructing analog beams and performing digital beam-forming to the analog beams so as to form equivalent beams; a first transmission module 32, configured for transmitting reference signals to a second communication node by using the equivalent beams; a first reception module 33, configured for receiving beam information about the equivalent beams and corresponding channel state information fed back by the second communication node according to the reference signals; and a second processing module 34, configured for performing a beam scanning operation and a search tracking operation by using the beam information and the channel state information.

The beam scanning and search tracking device provided in the third embodiment of the present disclosure transmits the reference signals to the second communication node by using the constructed equivalent beams and receives the information fed back by the second communication node according to the reference signals, and further performs the beam scanning and search tracking operation. An objective of obtaining the channel state information needed by a digital beam-forming is achieved when alignment of the analog beams is performed with the second communication node. That is, measuring and feeding back the channel state information (CSI) in the digital domain are combined effectively with searching analog beams, and unnecessary operations are greatly reduced and system overheads are reduced correspondingly.

The first processing module 31 may be implemented in following two ways.

First way, the first processing module includes: a first construction sub-module configured for constructing the analog beams; a first processing sub-module configured for weighting a group of reference signal ports by performing the digital beam-forming; and a second construction sub-module configured for constructing the analog beams as the equivalent beams by using the reference signal ports.

Accordingly, the first transmission module includes: a first scanning sub-module, configured for carrying the reference signals on the equivalent beams, and performing a beam scanning operation within a coverage range determined by the analog beams.

The first reception module includes a first reception sub-module configured for receiving identifier information about one or more equivalent beams and the channel state information fed back by the second communication node; wherein a coverage range of the equivalent beams is smaller than a coverage range of the analog beams corresponding to the equivalent beams.

The constructing analog beams is an operation in an analog domain and forms the analog beams. A specific procedure of the constructing analog beams may be performed by using methods in the relevant art and will not be repeated herein.

The channel state information may include a PMI, a RI and a corresponding CQI.

The beam scanning operation performed by using the equivalent beams may be performed periodically or non-periodically. Specific configuration parameters for the operation may be indicated by the first communication node or a network, or determined in a predetermined way.

Optionally, the identifier information of the equivalent beams includes identifier information of analog beams corresponding to the equivalent beams; or the first reception module further includes: a second reception sub-module configured for receiving the identifier information of the analog beams fed back by the second communication node, wherein the identifier information of the analog beams corresponds to the identifier information of the equivalent beams.

The analog beams being fed back correspond to the equivalent beams being fed back Second way, the first processing module includes: a third construction sub-module configured for constructing the analog beams; a second processing sub-module configured for performing a transmit diversity processing and/or a weighting processing to digital ports; and a fourth construction sub-module configured for constructing the analog beams as the equivalent beams by using the digital ports.

Correspondingly, the first reception module includes a third reception sub-module, configured for receiving identifier information and/or signal strengths of one or more equivalent beams and a channel quality index fed back by the second communication node; wherein difference between a coverage range of the equivalent beams and a coverage range of the analog beams corresponding to the equivalent beams is smaller than a predetermined threshold.

The constructing analog beams is an operation in the analog domain and forms the analog beams. A specific procedure of the constructing analog beams may be performed by using a method in the relevant art and will not be repeated herein.

The transmit diversity performed to the digital ports may be techniques such as a Frequency Switch Transmit Diversity (FSTD) or Space Frequency Block Code (SFBC) or the like.

The weighting processing performed to the digital ports may generate beams that are relatively wide.

The reference signals transmitted to the second communication node by using the equivalent beams may be performed periodically or non-periodically. Specific configuration parameters of the reference signals may be indicated by the first communication node or a network, or be determined in a predetermined way.

Further, the first processing module includes a third processing sub-module configured for constructing the analog beams and performing the beam scanning operation.

This step may be understood as a common selection procedure (i.e. a search tracking operation) of analog beams.

In order to obtain more accurate results, the embodiment further provides two measures.

First measure, the beam scanning and search tracking device further includes: a beam-forming module configured for performing an analog beam-forming operation to a group of reference signal ports according to one or more analog beams determined after performing the search tracking operation; and a second transmission module configured for transmitting, to the second communication node, reference signals outputted by the group of reference signal ports; a second reception module configured for receiving implicit feedback information or explicit feedback information fed back by the second communication node, wherein the implicit feedback information includes at least one of a Precoding Matrix Indicator (PMI), a Rank Indicator (RI), or a Channel Quality Indicator (CQI), and the explicit feedback information includes channel matrices or statistics information of the channel matrices after performing a quantization operation or a transformation operation.

The channel matrices may be complete matrices, or parts of sub-matrices, or may be parts of components. The statistics information may include at least one of correlation matrices, eigenvectors, or eigenvalues.

The second transmission module includes a transmission sub-module configured for transmitting the reference signals by using the analog beams, wherein the analog beams are not scanned; or the beam-forming module includes: a fifth construction sub-module configured for constructing a beam subset by taking the determined one or more analog beams as a center; a beam-forming sub-module configured for performing the analog beam-forming operation to a group of reference signal ports according to each analog beam in the beam subset.

Accordingly, the second transmission module includes: a second scanning submodule configured for using the analog beams to carry the reference signals outputted by the reference signal ports, and performing the beam scanning operation within the coverage range formed by the beam subset.

Second way, the beam scanning and search tracking device further includes a third processing module configured for, according to one or more analog beams determined after performing the search tracking operation, weighting a group of reference signal ports through a digital beam-forming technique, and constructing the equivalent beams; a fourth processing module configured for using the equivalent beams to carry the reference signals outputted by the reference signal ports, and performing the scanning operation within the coverage range determined from the corresponding analog beams, and transmitting the reference signals to the second communication node; and a third reception module configured for receiving the identifier information of the one or more equivalent beams and the channel state information fed back by the second communication node.

The channel state information herein may include the PMI, the RI and the corresponding CQI.

The scanning operation performed by using the equivalent beams may be performed periodically or non-periodically. Specific configuration parameters of the operation may be indicated by the first communication node or the network, or performed in a predetermined way.

Specifically, the third processing module includes: a fourth processing sub-module configured for weighting the group of reference signal ports through the digital beam-forming technique according to one or more analog beams determined after performing the search tracking operation; and a sixth construction sub-module configured for constructing each determined analog beam as the equivalent beam by using the reference signal ports; or the third processing module includes: a seventh construction sub-module configured for constructing a beam subset by taking, as a center, one or more analog beams determined after performing the search tracking operation; a fifth processing sub-module configured for weighting the group of reference signal ports through the digital beam-forming technique; and an eighth construction sub-module configured for constructing each analog beam in the beam subset as the equivalent beam by using the reference signal ports.

Further, the identifier information of the equivalent beams includes identifier information of analog beams corresponding to the equivalent beams. Optionally, the beam scanning and search tracking device further includes: a fourth reception module configured for receiving the identifier information of the analog beams fed back by the second communication node, wherein the identifier information of the analog beams corresponds to the identifier information of the equivalent beams.

In view of the above, the beam scanning and search tracking device provided in the embodiments of the present disclosure combines the scanning analog beams with measuring and feeding back digital CSIs, and the problem in relevant art that the measurement and feedback mechanism for analog beams and the measurement and feedback mechanism for digital beams are independent from each other and large redundancy and system overheads exist is addressed.

The examples in the above beam scanning and search tracking method are all applicable to the embodiments of the beam scanning and search tracking device, and same technical effects may be obtained.

Fourth Embodiment

Figure 4:
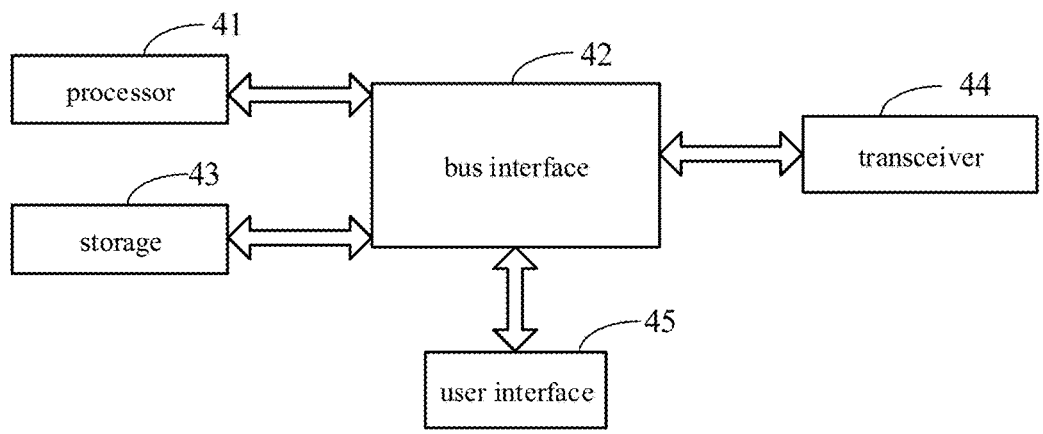
FIG. 4 is a structural schematic diagram of a first communication node according to a fourth embodiment of the present disclosure.

As shown in FIG. 4, the fourth embodiment of the present disclosure provides a first communication node. The first communication node includes: a processor 41 and a storage 43 connected to the processor 41 through a bus interface 42, wherein the storage 43 is configured to store programs and data used by the processor 41 when the processor 41 performs operations, and when the processor 41 invokes and executes the programs and the data stored in the storage 43, the processor 41 performs following steps: constructing analog beams and performing digital beam-forming to the analog beams so as to form equivalent beams; transmitting, through a transceiver 44, reference signals to a second communication node by using the equivalent beams; receiving, through the transceiver 44, beam information about the equivalent beams and corresponding channel state information fed back by the second communication node according to the reference signals; performing a beam scanning operation and a search tracking operation by using the beam information and the channel state information.

The transceiver 44 is connected to the bus interface 42 and is configured to transmit data and receive data under a control of the processor 41.

It should be noted that, in FIG. 4, the bus interface may include any number of buses and bridges connected together. Specifically, a plurality of processors such as the processor 41 and a plurality of storages such as the storage 43 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 44 may include a plurality of elements such as receivers, transmitters, and units for communicating with other devices through a transmission medium. Directed to different terminals, the user interface 45 may also be an interface capable of being connected to external devices or internal devices including, but not limited to, keypads, displays, speakers, microphones, joysticks, or the like. The processor 41 takes charge of the bus interface and general processing. The storage 43 may store data used by the processor 41 when the processor 41 performs operations.

It may be understood that, a part or all of the steps of the above embodiments may be implemented by hardware or by hardware instructed by computer programs. The computer programs include instructions for executing a part of all of the steps in the above method, and may be stored in a computer readable storage medium. The computer readable storage medium in the present disclosure may be any type of storage medium.

Fifth Embodiment

Figure 5:
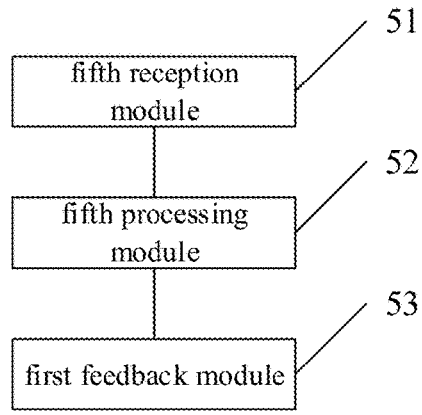
FIG. 5 is a structural schematic diagram of a beam scanning and search tracking device according to a fifth embodiment of the present disclosure.

As shown in FIG. 5, the fifth embodiment of the present disclosure provides a beam scanning and search tracking device. The beam scanning and search tracking device is applied in a second communication node. The beam scanning and search tracking device includes: a fifth reception module 51 configured for receiving reference signals transmitted by a first communication node through constructed equivalent beams; a fifth processing module 52 configured for measuring the reference signals and obtaining beam information about the equivalent beams satisfying a recommendation condition and corresponding channel state information; a first feedback module 53 configured for feeding the beam information and the corresponding channel state information back to the first communication node.

The feeding back by the first feedback module 53 may be performed periodically or non-periodically. Specific configuration parameters of the feeding back may be indicated by the first communication node or a network, or performed in a predetermined way.

In the beam scanning and search tracking device provided in the fifth embodiment of the present disclosure, the reference signals transmitted by the first communication node are received, and the beam information about equivalent beams satisfying the recommendation condition and the corresponding channel state information are obtained through measurement and are fed back, so that an objective of obtaining the channel state information needed by the digital beam-forming is achieved when the first communication node performs alignment of the analog beams with the second communication node. That is, measuring and feeding back the channel state information (CSI) in the digital domain are combined effectively with searching analog beams, and unnecessary operations are greatly reduced and system overheads are reduced correspondingly.

The fifth reception module 51 may be implemented in following two ways.

First way, the fifth reception module includes: a fourth reception sub-module configured for receiving the reference signals transmitted by the first communication node through equivalent beam scanning. Correspondingly, the fifth processing module includes a sixth processing sub-module configured for measuring the reference signals and obtaining identifier information of the equivalent beams satisfying the recommendation condition and the corresponding channel state information.

Optionally, the identifier information of the equivalent beams includes identifier information of analog beams corresponding to the equivalent beams; or the fifth processing module includes a seventh processing sub-module configured for measuring the reference signals and obtaining identifier information of analog beams corresponding to the equivalent beams satisfying the recommendation condition.

Second way, the fifth reception module includes: a fifth reception sub-module configured for receiving the reference signals transmitted through the equivalent beams by the first communication node, wherein the equivalent beams are not scanned. Correspondingly, the fifth processing module includes an eighth processing sub-module configured for measuring the reference signals and obtaining identifier information and/or signal strengths of the equivalent beams satisfying the recommendation condition and corresponding channel quality indicators.

Further, the fifth reception module includes: a sixth reception sub-module configured for receiving the reference signals transmitted through the constructed equivalent beams by the first communication node and the reference signals transmitted through the analog beams corresponding to the equivalent beams.

In order to obtain more accurate results, the embodiment further provides two measures.

First measure, the beam scanning and search tracking device further includes: a sixth reception module configured for receiving the reference signals transmitted by the first communication node through the analog beams determined according to the beam information; a sixth processing module configured for measuring the reference signals and obtaining an implicit feedback information or explicit feedback information corresponding to the analog beams; a second feedback module configured for feeding back the implicit feedback information or the explicit feedback information to the first communication node, wherein the implicit feedback information includes at least one of a Precoding Matrix Indicator (PMI), a Rank Indicator (RI), or a channel quality indicator (CQI), and the explicit feedback information includes channel matrices or statistics information of the channel matrices after performing a quantization operation or a transformation operation.

The feeding back herein may be performed periodically or non-periodically. Specific configuration parameters for the feeding back may be indicated by the first communication node or a network, or performed in a predetermined way.

The channel matrices may be complete matrices, or parts of sub-matrices, or may be parts of components. The statistics information may include at least one of correlation matrices, eigenvectors, or eigenvalues.

The sixth reception module includes: a seventh reception sub-module configured for receiving the reference signals transmitted through the determined analog beams by the first communication node, wherein the analog beams are not scanned; or an eighth reception sub-module configured for receiving the reference signals transmitted by the first communication node through a determined analog-beam scanning manner.

Second measure, the beam scanning and search tracking device further includes: a seventh reception module configured for receiving the reference signals transmitted by the first communication node through the equivalent beams constructed according to the determined analog beams; a seventh processing module configured for measuring the reference signals and obtaining beam information about the equivalent beams satisfying a recommendation condition and corresponding channel state information; a third feedback module configured for feeding back the beam information about the equivalent beams and the channel state information to the first communication node.

The feeding back herein may be performed periodically or non-periodically. Specific configuration parameters for the feeding back may be indicated by the first communication node or a network, or performed in a predetermined way.

Specifically, the seventh reception module includes: a ninth reception sub-module configured for receiving the reference signals transmitted by the first communication node through the equivalent beams constructed from a group of reference signal ports, wherein the group of reference signal ports are weighted through digital beam-forming according to the determined one or more analog beams; or a tenth reception sub-module configured for receiving the reference signals transmitted by the first communication node through the equivalent beams constructed from the group of reference signal ports, wherein a beam subset is constructed by taking the determined one or more analog beams as a center, and the group of reference signal ports are weighted through the digital beam-forming according to each analog beam in the beam set.

Further, the identifier information of the equivalent beams includes identifier information of analog beams corresponding to the equivalent beams; or the beam scanning and search tracking device further includes an eighth processing module configured for measuring the reference signals and obtaining identifier information of analog beams corresponding to equivalent beams satisfying recommendation conditions; and a fourth feedback module configured for feeding back the identifier information of the analog beams to the first communication node.

In view of the above, the beam scanning and search tracking device provided in the embodiments of the present disclosure combines analog beam scanning with digital CSI measurement and feedback, and the problem in relevant art that the measurement and feedback mechanisms for analog beams and the measurement and feedback mechanisms for digital beams are independent from each other and large redundancy and system overheads exist is addressed.

The examples in the above beam scanning and search tracking method are all applicable to the embodiments of the beam scanning and search tracking device, and same technical effects may be obtained.

Sixth Embodiment

Figure 6:
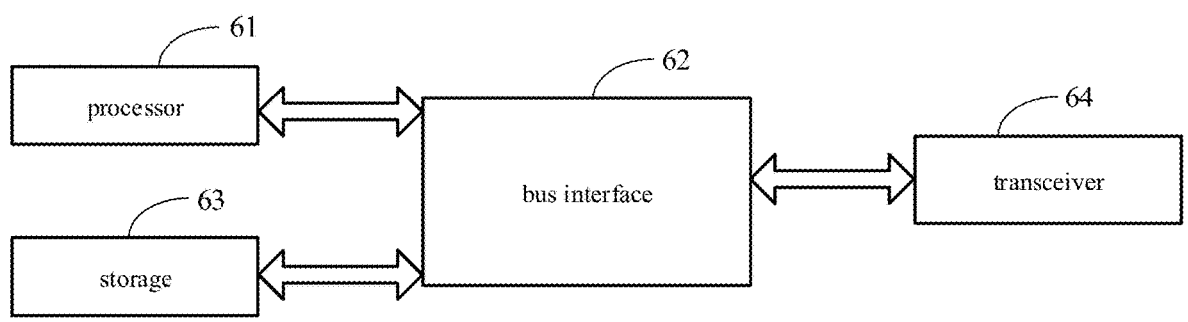
FIG. 6 is a structural schematic diagram of a second communication node according to a sixth embodiment of the present disclosure.

As shown in FIG. 6, the present disclosure provides a second communication node. The second communication node includes: a processor 61 and a storage 63 connected to the processor 61 through a bus interface 62, wherein the storage 63 is configured to store programs and data used by the processor 61 when the processor 61 performs operations, and when the processor 61 invokes and executes the programs and the data stored in the storage 63, the processor 61 performs following steps: receiving, through a transceiver 64, reference signals transmitted by a first communication node through constructed equivalent beams; measuring the reference signals and obtaining beam information about the equivalent beams satisfying a recommendation condition and corresponding channel state information; feeding back, through the transceiver 64, the beam information about the equivalent beams and the corresponding channel state information to the first communication node.

The transceiver 64 is connected to the bus interface 62 and is configured to transmit data and receive data under a control of the processor 61.

It should be noted that, in FIG. 6, the bus interface may include any number of buses and bridges connected together. Specifically, various circuits including a plurality of processors such as the processor 61 and a plurality of storages such as the storage 63 are connected together. The bus interface may also cause any other circuits such as a peripheral device, a voltage regulator and a power management circuit to be connected together. The circuits are known in the art, and thus detailed descriptions thereof are not further provided herein. The bus interface provides an interface. The transceiver 64 may include a plurality of elements such as receivers, transmitters, and units for communicating with other devices through a transmission medium. The processor 61 takes charge of the bus interface and general processing. The storage 63 may store data used by the processor 61 when the processor 100 performs operations.

Some embodiments of the present disclosure further provide a communication system which includes the first communication node as shown in FIG. 4 and the second communication node as shown in FIG. 6.

It may be understood that, a part or all of the steps of the above embodiments may be implemented by hardware or by hardware instructed by computer programs. The computer programs include instructions for executing a part of all of the steps in the above method, and may be stored in a computer readable storage medium. The computer readable storage medium in the present disclosure may be any type of storage medium.

It should be noted that many functional components described herein may be called modules/sub-modules/units so as to more specifically emphasize independence of implementations of the components.

The modules/sub-modules/units may be implemented by software in embodiments of the present disclosure so as to be performed by various types of processors. For example, an identified module including executable codes may be one or more physical or logical modules including computer instructions. For example, the identified module may be implemented as an object, a process or a function. Despite of this, the executable codes of the identified module need not be physically located in a same place, but may include different instructions stored at different positions. However, when the instructions are logically integrated, the instructions form the module and achieve specific functions of the module.

Actually, the executable codes of the module may be a single instruction or many instructions, or may be even distributed at different code segments, distributed in different programs, or distributed at different storage devices. Similarly, operational data may be identified in a module, and may be implemented in any suitable manner and may be organized in any suitable type of data structure. The operational data may be collected as a single data set, or may be distributed at a plurality of positions (included at different storage devices), and may at least partially be electronic signals existing in a network or a system.

When the module may be implemented by software, the module may be implemented by the software if a current hardware manufacture level is considered; and one skilled in the art may construct a corresponding hardware and/or circuits to implement the function corresponding to the module without consideration of costs. The hardware and/or circuits include a general Very Large Scale Integration (VLSI) circuits or a gate array, or a current semiconductor or other discrete component such as logical chips or transistors. The module may also be implemented by using a programmable hardware device such as a Field Programmable Gate Array (FPGA), a programmable array logic (PAL), a programmable logic device (PLD), or the like.

The above are only alternative embodiments of the present disclosure. It should be pointed out that numerous modifications and embellishments can be done by one skilled in the art without departing the spirit of the present disclosure. Such modifications and embellishments should also be considered to be within the protection scope of the present disclosure.

What is claimed is:

1. A beam scanning and search tracking method applied to a first communication node, comprising:
constructing analog beams and performing digital beam-forming to the analog beams so as to form equivalent beams;
transmitting reference signals to a second communication node by using the equivalent beams;
receiving beam information about the equivalent beams and corresponding channel state information fed back by the second communication node according to the reference signals;
performing a beam scanning operation and a search tracking operation by using the beam information and the channel state information.

2. The beam scanning and search tracking method according to claim 1, wherein the constructing the analog beams and the performing the digital beam-forming to the analog beams to form equivalent beams, comprises:
constructing the analog beams,
weighting a group of reference signal ports by performing the digital beam-forming,
constructing the analog beams as the equivalent beams by using the group of reference signal ports;
the transmitting the reference signals to the second communication node by using the equivalent beams, comprises:
carrying the reference signals on the equivalent beams, and performing a beam scanning operation within a coverage range determined by the analog beams;
the receiving beam information about the equivalent beams and corresponding channel state information fed back by the second communication node according to the reference signals, comprises:
receiving identifier information about one or more equivalent beams and the channel state information fed back by the second communication node, wherein a coverage range of the equivalent beams is smaller than a coverage range of the analog beams corresponding to the equivalent beams.

3. The beam scanning and search tracking method according to claim 2, wherein, the identifier information of the equivalent beams comprises identifier information of analog beams corresponding to the equivalent beams; or
the receiving beam information about the equivalent beams and corresponding channel state information fed back by the second communication node according to the reference signals, comprises:
receiving the identifier information of the analog beams fed back by the second communication node, wherein the identifier information of the analog beams corresponds to the identifier information of the equivalent beams.

4. The beam scanning and search tracking method according to claim 1, wherein the constructing analog beams and the performing digital beam-forming to the analog beams to form equivalent beams, comprises:
constructing the analog beams,
performing a transmit diversity processing and/or a weighting processing to digital ports; and
constructing the analog beams as the equivalent beams by using the digital ports;
the receiving beam information about the equivalent beams and corresponding channel state information fed back by the second communication node according to the reference signals, comprises:
receiving identifier information and/or signal strengths of one or more equivalent beams and channel quality indicators fed back by the second communication node.

5. The beam scanning and search tracking method according to claim 1, wherein the constructing analog beams and the performing digital beam-forming to the analog beams to form equivalent beams, comprises:
constructing the analog beams, and performing the beam scanning operation.

6. The beam scanning and search tracking method according to claim 1, further comprising:
performing an analog beam-forming operation to a group of reference signal ports according to one or more analog beams determined after performing the search tracking operation;
transmitting, to the second communication node, reference signals outputted by the group of reference signal ports;
receiving implicit feedback information or explicit feedback information fed back by the second communication node,
wherein the implicit feedback information comprises at least one of a Precoding Matrix Indicator (PMI), a Rank Indicator (RI), or a Channel Quality Indicator (CQI), and the explicit feedback information comprises channel matrices or statistics information of the channel matrices after performing a quantization operation or a transformation operation.

7. The beam scanning and search tracking method according to claim 6, wherein,
the transmitting, to the second communication node, reference signals outputted by the group of reference signal ports, comprises:
transmitting the reference signals by using the analog beams, wherein the analog beams are not scanned; or
the performing the analog beam-forming operation to a group of reference signal ports according to one or more analog beams determined after performing the search tracking operation, comprises:
constructing a beam subset by taking the determined one or more analog beams as a center, and
performing the analog beam-forming operation to a group of reference signal ports according to each analog beam in the beam subset;
the transmitting, to the second communication node, reference signals outputted by the group of reference signal ports, comprises:
using the analog beams to carry the reference signals outputted by the group of reference signal ports, and
performing the beam scanning operation within the coverage range formed by the beam subset.

8. The beam scanning and search tracking method according to claim 1, further comprising:
according to one or more analog beams determined after performing the search tracking operation, weighting a group of reference signal ports through digital beam-forming, and constructing the equivalent beams;
using the equivalent beams to carry the reference signals outputted by the group of reference signal ports, and performing the beam scanning operation within a coverage range determined from the corresponding analog beams, and transmitting the reference signals to the second communication node;

receiving identifier information of the one or more equivalent beams and channel state information fed back by the second communication node.

9. The beam scanning and search tracking method according to claim 8, wherein, the according to one or more analog beams determined after performing the search tracking operation, weighting the group of reference signal ports through the digital beam-forming, and constructing the equivalent beams, comprises:
according to one or more analog beams determined after performing the search tracking operation, weighting the group of reference signal ports through the digital beam-forming, and constructing each of the determined analog beams as an equivalent beam by using the group of reference signal ports; or
constructing a beam subset by taking, as a center, the one or more analog beams determined after performing the search tracking operation, weighting the group of reference signal ports through the digital beam-forming; and constructing each of the one or more analog beams in the beam subset as the equivalent beam by using the group of reference signal ports; and/or
the identifier information of the equivalent beams comprises identifier information of analog beams corresponding to the equivalent beams; or
the beam scanning and search tracking method further comprises:
receiving the identifier information of the analog beams fed back by the second communication node, wherein the identifier information of the analog beams corresponds to the identifier information of the equivalent beams.

10. A first communication node, comprising:
a transceiver, a processor and a storage, wherein
the storage is configured to store programs and/or data,
the transceiver is configured to transmit and receive data and/or signals under a control of the processor,
the processor is configured for, through performing the programs and/or the data stored in the storage, performing the method according to claim 1.

11. A beam scanning and search tracking method applied to a second communication node, comprising:
receiving reference signals transmitted by a first communication node through constructed equivalent beams;
measuring the reference signals and obtaining beam information about the equivalent beams satisfying a recommendation condition and corresponding channel state information;
feeding the beam information and the corresponding channel state information back to the first communication node,
wherein measuring the reference signals and obtaining beam information about the equivalent beams satisfying the recommendation condition and corresponding channel state information comprises:
measuring the reference signals and obtaining identifier information of the equivalent beams satisfying the recommendation condition and the corresponding channel state information, or,
measuring the reference signals and obtaining identifier information and/or signal strengths of the equivalent beams satisfying the recommendation condition and corresponding channel quality indicators.

12. The beam scanning and search tracking method according to claim 11, wherein in a case of measuring the reference signals and obtaining identifier information of the equivalent beams satisfying the recommendation condition and the corresponding channel state information, the receiving the reference signals transmitted by the first communication node through the constructed equivalent beams, comprises:
receiving the reference signals transmitted by the first communication node through equivalent beam scanning.

13. The beam scanning and search tracking method according to claim 12, wherein, the identifier information of the equivalent beams comprises identifier information of analog beams corresponding to the equivalent beams; or
measuring the reference signals and obtaining identifier information of the equivalent beams satisfying the recommendation condition and the corresponding channel state information, comprises:
measuring the reference signals and obtaining identifier information of analog beams corresponding to the equivalent beams satisfying the recommendation condition.

14. The beam scanning and search tracking method according to claim 11, wherein in a case of measuring the reference signals and obtaining identifier information and/or signal strengths of the equivalent beams satisfying the recommendation condition and corresponding channel quality indicators, the receiving the reference signals transmitted by the first communication node through the constructed equivalent beams comprises:
receiving the reference signals transmitted through the equivalent beams by the first communication node, wherein the equivalent beams are not scanned.

15. The beam scanning and search tracking method according to claim 11, wherein the receiving the reference signals transmitted through the constructed equivalent beams by the first communication node comprises:
receiving the reference signals transmitted through the constructed equivalent beams by the first communication node and the reference signals transmitted through analog beams corresponding to the equivalent beams.

16. The beam scanning and search tracking method according to claim 11, further comprising:
receiving the reference signals transmitted by the first communication node through analog beams determined according to the beam information;
measuring the reference signals and obtaining implicit feedback information or explicit feedback information corresponding to the analog beams;
feeding back the implicit feedback information or the explicit feedback information to the first communication node,
wherein the implicit feedback information comprises at least one of a Precoding Matrix Indicator (PMI), a Rank Indicator (RI), or a channel quality indicator (CQI), and the explicit feedback information comprises channel matrices or statistics information of the channel matrices after performing a quantization operation or a transformation operation.

17. The beam scanning and search tracking method according to claim 16, wherein the receiving the reference signals transmitted by the first communication node through the analog beams determined according to the beam information, comprises:
receiving the reference signals transmitted through the determined analog beams by the first communication node, wherein the analog beams are not scanned; or
receiving the reference signals transmitted by the first communication node through a determined analog-beam scanning manner.

18. The beam scanning and search tracking method according to claim 11, further comprising:
- receiving the reference signals transmitted by the first communication node through the equivalent beams constructed according to determined analog beams;
- measuring the reference signals and obtaining beam information about the equivalent beams satisfying the recommendation condition and corresponding channel state information;
- feeding back the beam information about the equivalent beams and the channel state information to the first communication node.

19. The beam scanning and search tracking method according to claim 18, wherein the receiving the reference signals transmitted by the first communication through the equivalent beams constructed according to determined analog beams, comprises:
- receiving the reference signals transmitted by the first communication node through the equivalent beams constructed from a group of reference signal ports, wherein the group of reference signal ports is weighted through digital beam-forming according to determined one or more analog beams; or
- receiving the reference signals transmitted by the first communication node through the equivalent beams constructed from a group of reference signal ports, wherein a beam subset is constructed by taking determined one or more analog beams as a center, and the group of reference signal ports is weighted through the digital beam-forming according to each analog beam in the beam set; and/or identifier information of the equivalent beams comprises identifier information of analog beams corresponding to the equivalent beams; or the beam scanning and search tracking method further comprises:
- measuring the reference signals and obtaining identifier information of analog beams corresponding to equivalent beams satisfying the recommendation condition;
- feeding back the identifier information of the analog beams to the first communication node.

20. A second communication node, comprising:
a transceiver, a processor and a storage, wherein
the storage is configured to store programs and/or data,
the transceiver is configured to transmit and receive data and/or signals under a control of the processor,
the processor is configured for, through performing the programs and/or the data stored in the storage, performing the method according to claim 11.

* * * * *